United States Patent
Dunton

(10) Patent No.: US 7,911,536 B2
(45) Date of Patent: Mar. 22, 2011

(54) SCREEN FILLED DISPLAY OF DIGITAL VIDEO CONTENT

(75) Inventor: Randy R. Dunton, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 787 days.

(21) Appl. No.: 10/950,310

(22) Filed: Sep. 23, 2004

(65) Prior Publication Data

US 2006/0061687 A1    Mar. 23, 2006

(51) Int. Cl.
    *H04N 7/01*      (2006.01)
    *H04N 11/20*      (2006.01)
    *H04N 7/00*      (2006.01)
    *H04N 11/00*      (2006.01)
    *H04N 5/445*      (2006.01)
    *H04N 9/74*      (2006.01)

(52) U.S. Cl. ........ 348/556; 348/564; 348/581; 348/584; 348/588; 348/445; 348/468

(58) Field of Classification Search .......... 348/563–570, 348/580–582, 555–556, 584, 588, 445, 468
See application file for complete search history.

(56) References Cited

U.S. PATENT DOCUMENTS

| | | | | | |
|---|---|---|---|---|---|
| 5,170,256 | A | * | 12/1992 | Tabata | 348/556 |
| 5,298,995 | A | * | 3/1994 | Monta et al. | 348/458 |
| 5,546,131 | A | * | 8/1996 | Terry | 348/564 |
| 5,557,338 | A | * | 9/1996 | Maze et al. | 725/38 |
| 5,708,475 | A | * | 1/1998 | Hayashi et al. | 348/468 |
| 5,734,436 | A | * | 3/1998 | Abe et al. | 348/564 |
| 5,963,270 | A | * | 10/1999 | Hwang | 348/588 |
| 6,002,797 | A | * | 12/1999 | Mori et al. | 382/173 |
| 6,185,329 | B1 | * | 2/2001 | Zhang et al. | 382/176 |
| 6,275,267 | B1 | * | 8/2001 | Kobayashi | 348/555 |
| 6,297,797 | B1 | * | 10/2001 | Takeuchi et al. | 345/467 |
| 6,366,706 | B1 | * | 4/2002 | Weitbruch | 382/254 |
| 6,532,041 | B1 | * | 3/2003 | Monta et al. | 348/468 |
| 6,535,688 | B1 | * | 3/2003 | Kawamura et al. | 386/95 |
| 6,556,252 | B1 | * | 4/2003 | Kim | 348/565 |
| 6,621,927 | B1 | * | 9/2003 | Nakagaki et al. | 382/173 |
| 6,678,009 | B2 | * | 1/2004 | Kahn | 348/569 |
| 6,707,504 | B2 | * | 3/2004 | Chung | 348/569 |
| 6,833,874 | B2 | * | 12/2004 | Ozaki et al. | 348/565 |
| 6,927,801 | B2 | * | 8/2005 | Yugami et al. | 348/458 |
| 6,977,689 | B1 | * | 12/2005 | Mace | 348/465 |
| 7,023,495 | B2 | * | 4/2006 | Miki et al. | 348/584 |
| 7,046,302 | B2 | * | 5/2006 | Konuma | 348/558 |
| 7,075,587 | B2 | * | 7/2006 | Lee | 348/563 |
| 7,085,479 | B2 | * | 8/2006 | Cookson et al. | 386/125 |
| 7,095,450 | B1 | * | 8/2006 | Holmes et al. | 348/586 |

(Continued)

*Primary Examiner* — Brian Yenke

(74) *Attorney, Agent, or Firm* — Blakely Sokoloff, Taylor & Zafman LLP

(57) ABSTRACT

A dynamic region, such as subtitles, is detected in a stream of digital video, and displayed along with a static region also in the stream, such as a video region, so that nearly all of the total vertical display area of a monitor displaying the dynamic and static regions is filled. For example, when the dynamic region is detected, the vertical size of the static region is adjusted to allow the vertical display of the dynamic and static region on the monitor simultaneously, without extending beyond or reducing to less than the total vertical display size of the monitor. Also, when the dynamic region is not detected, the vertical height of the static region is adjusted to fill the total vertical display size. Moreover, iterative increase and decrease in the vertical sizes of the regions may allow for a more pleasant viewer experience.

33 Claims, 4 Drawing Sheets

U.S. PATENT DOCUMENTS

| | | | |
|---|---|---|---|
| 7,099,570 B2 * | 8/2006 | Itani | 386/131 |
| 7,129,990 B2 * | 10/2006 | Wredenhagen et al. | 348/449 |
| 7,196,733 B2 * | 3/2007 | Aratani et al. | 348/581 |
| 7,224,401 B2 * | 5/2007 | Ackley et al. | 348/556 |
| 2002/0075407 A1 * | 6/2002 | Cohen-Solal | 348/565 |
| 2002/0186320 A1 * | 12/2002 | Carlsgaard et al. | 348/468 |
| 2003/0011712 A1 * | 1/2003 | Matey | 348/565 |
| 2003/0025833 A1 * | 2/2003 | Mountain | 348/468 |
| 2003/0189669 A1 * | 10/2003 | Bowser | 348/564 |

* cited by examiner

SCREEN FILLED DISPLAY OF DIGITAL VIDEO CONTENT

BACKGROUND

1. Field

Display of digital video.

2. Background

The advent of digital television (DTV) allows a viewer to see video content formatted for DTV, 16:9 TV screen, and/or a movie theater by filling the entire active display area of a DTV screen or monitor. For example, a DTV program or movie as presented in a theater may be shown on a 16:9 TV screen and fill the entire vertical display space and horizontal display space of that screen where the entire vertical display space and the entire horizontal display space describe a total active display area for the screen. Thus, the screen's total active display area is filled such that the screen does not display vertical or horizontal portions that are blank, black, or without video content. Sections where regions of the screen that are blank, black, or without video content are typically described as "pillar-bars" in the case where 4:3 content is viewed on a 16:9 display, and for the case where the video content is wider than the display, this is usually referred to as displaying the video content in a "letterbox" format (the horizontal bars resembling a "letter box"). Only video produced for analog TV and viewed on an analog TV will have a perfect match, most other cases will require "pillar bar", "letter box", cropping such as "Pan and scan", or scaling which does not preserve the original content aspect ratio.

However, broadcast video (e.g., a TV program), which is typically shot in 4:3 ratio (1.33:1) along with "wide screen" movie theater content, is viewed on most 16:9 DTV devices by using "pillar-bars" or "letterbox". For example, it is possible to adjust the display size of the active material or content to be displayed on the DTV, by manually adjusting the vertical and/or horizontal display size menu options of a DTV, so that the content will completely fill the vertical display space or horizontal display space of the DTV screen.

Moreover, some TV programs, movies, digital video disc (DVD), and digital TV source content (e.g., such as satellite broadcast) may be in ratios other than 4:3, or 16:9. For example, in some cases, "standard" pillarbox or letterbox cropping (e.g., such as cropping to properly fit video in 4:3 ratio onto a 16:9 TV screen) may interfere with "active" material or content in the program or movie (e.g., such as by not displaying all of the active material or content of the program on the monitor because parts of the active material or content that has an aspect ratio other than 4:3 extend beyond the monitor edges).

In addition, where the active material or content has a certain vertical display size during one period of a TV program or movie, and then has a different vertical display size, during another period of the TV show or movie, display of the portions of the content in the larger vertical size may not fit on the screen. Specifically, where the content excludes subtitles during some parts of a movie, but includes subtitles having a vertical display size to be displayed below the video or "picture" portion (e.g., such as in a 2.2:1 ratio to be displayed below the video content), the subtitles may extend below or beyond the total vertical display size of the screen, and thus not be viewable. This is because current DTV technology does not adjust the vertical display size of the active material or content to fill the vertical display space of the screen when the vertical display size of the active material or content changes. In other words, a user who sets up a DTV to fill an entire 16:9 ratio screen with a 16:9 TV program or movie video or "picture" portion, may be unable to view subtitles that appear below the 16:9 program or movie because the subtitles are below the active display area of the screen and therefore are not displayed, without going into the DTV screen menu and adjusting the vertical display size of the active material or content of the program or movie to fit within the screen. As a result, to view the subtitles, it is possible to adjust the vertical display size of the TV program or movie video or "picture" portion, using a DTV's menus, to be less than the total vertical display space of the screen, so that when the subtitles appear, they fit within the total vertical display space of the screen. However, this adjustment will leave a "pillar-bar" or a rectangle below the movie active material or content in the region of the screen where the subtitles were displayed when the subtitles are not present. Thus the display size of the TV program or movie active material or content, without the subtitles, will have a vertical display size less than the available vertical screen size when the subtitles are not present.

Moreover, the creator of a TV program or a theater movie may choose to format in a ratio other than 4:3 or 16:9 (e.g., such as 2.66:1, 2.35:1, 2.20:1, or some other ratio), or the TV program or movie may include menus, photos, and special features (e.g., that have a ratio other than 4:3 or 16:9). Thus, similarly to the description above for subtitles, a user or viewer having a monitor (e.g., such as a DTV with a 16:9 ratio) set up to fill the entire active area of a DTV screen with a TV program or movie may be unable to view portions, segments, menus, or photos or specifications that extent beyond the total active display area of the screen as originally set up on the DTV. Such situations necessitate set up of the DTV to shrink the display of the TV program or movie video or "picture" portion prior to or during viewing of the TV program or movie. For example, prior to or during viewing of the TV program or movie, the DTV may be set up with conservative or larger pillar-bars or letterbox so that the content that is extended beyond the total active display area of the monitor or screen during all of the movie, menus, photos, special features, and subtitles, can now be viewed. In this case, the active material or "picture" content of the program or movie will be smaller than necessary.

BRIEF DESCRIPTION OF THE DRAWINGS

Various features, aspects and advantages will become more thoroughly apparent from the following detailed description, the set of claims, and accompanying drawings in which:

DETAILED DESCRIPTION

Figure 1:
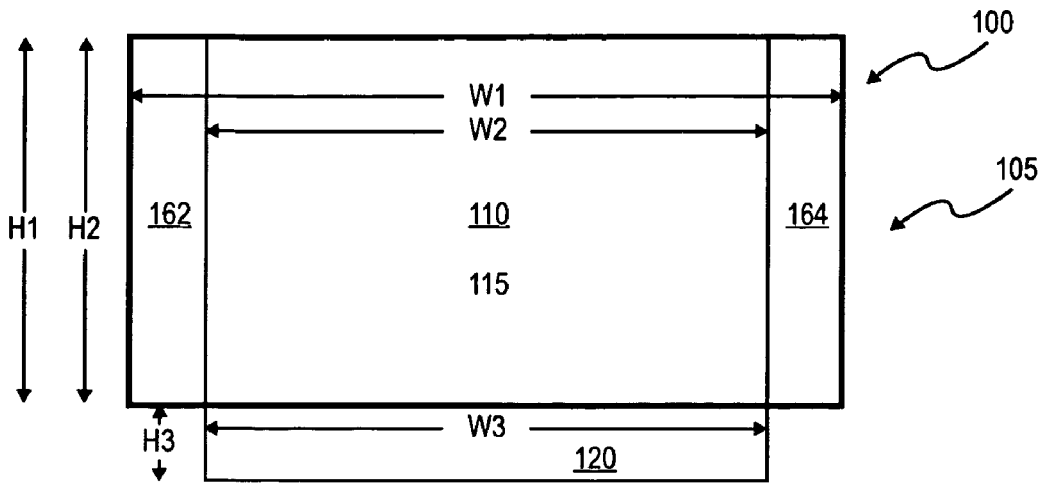
FIG. 1 shows a monitor active display area displaying a static region.

Active material or content of digital video (e.g., such as coded or compressed digital video data for display on a digital television (DTV)), digital television (TV) programs, and digital movie data may be recorded, broadcast, "streamed," or otherwise provided for display on a DTV in various aspect ratios and may include subtitles, menus, photos, and special features such that the active material or content changes in horizontal and/or vertical display size. Thus, to maximize the horizontal and/or vertical display size of the active material or content to completely fill the horizontal and/or vertical display space of the DTV screen or monitor, it may be desirable to adjust the horizontal and/or vertical display size menu of the DTV. Moreover, when the vertical display size of the active material or content of a single TV program or movie changes during the TV or movie, such as to include or exclude subtitles, such adjustment may also be desirable to fill the screen.

One way to make such adjustment is by manually adjusting the display size of the DTV screen using the display size menu or control feature (e.g., such as by manipulating buttons on the DTV or a remote control therefore). Thus, the display size may be set to a specific vertical display size initially, such as prior to beginning the TV program or movie, and may be changed whenever the vertical display size of the active material or content increases or decreases, such as when subtitles are present, or not present (e.g., such as by stopping the program or movie, if possible, or by adjusting the vertical display size during the TV program or movie). In some cases, the user may repeatedly pull up the menu of the DTV to increase the vertical display size of the TV program or movie to fill the vertical display space of the screen when the subtitles are not present, and to reduce the vertical display size of the TV program or movie to display the subtitles when the subtitles are present. However, it can be appreciated that this solution is less than desirable, because such manual adjustment are inconvenient, time consuming, and may cause a viewer to miss content when the menu is displayed on the screen and the display of content cannot be halted, such as during a broadcast.

According to embodiments, the increase or decrease in the horizontal and/or vertical display size of the active material or content can be detected and the horizontal and/or vertical size of the active material or content can be adjusted automatically, during display of the active material or content, so that manual adjustment is not required. It can be appreciated that display of the active material or content to "best fit" or fill the horizontal and/or vertical display size of the screen may require vertical and/or horizontal portions or sections of the screen that are blank, black, or do not display active material or content. Such blank, black, or portions that do not display active material or content may be referred to as "pillar-bars" or may describe a display screen that displays content in "letterbox" format.

Thus, a recording, broadcast, or stream of digital video active material or content may include a static region (e.g., such as a video or "picture" region) designed into the digital video stream for displaying video or "picture" in a constant manner, such as in a vertical and horizontal display space or region of the screen that does not change size over time. In addition, the recording, broadcast or stream may include a dynamic region (e.g., such as a region that extends in size beyond the vertical and horizontal display space of the static region) design into the digital video stream to display, text, subtitles, portions of menus, photos, and special features designed to selectively appear and disappear on the screen during display of the recording, broadcast or stream. As an example, the static region of a stream of digital video may be the large video portion of a movie or film, while the dynamic region may be subtitles that appear below the video portion at some times and are not present at other times of the movie. In other words, the static region may be "on" all of the time during a program or stream, while the dynamic region could be "on" or "off" during the program or stream.

Hence, a static region may be coded into a digital stream of video to be displayed in a specific region of the screen, while the dynamic region is coded into the video to be displayed in another region of the screen, where the regions of the screen for the active and static region are defined and coded into the video stream for playback. The combination of the static region and the dynamic region may be defined as the active material or content.

For instance, FIG. 1 shows a monitor or screen active display area displaying a static region. FIG. 1 shows regions 100 including a monitor total active display area, area 105, having width W1 and height H1. The terms "screen" and "monitor" are used herein interchangeably. As shown in FIG. 1, area 105 is indicated by a thicker bordered region in FIG. 1, and includes pillarboxed portion 115 having width W2 and height H2. Area 105 may be an area of a DTV monitor or screen available for displaying digital video active material or content. Width W2 may correspond to, be equal to, or be less than width W1. Height H2 may correspond to, be equal to, or be nearly equal to height H1. Area 105 also includes pillarbars 162 and 164 to either side of video pillarboxed portion 115. Pillar-bars 162 and 164 have height H1. Pillar-bars 162 and 164 may combine to have a width that is equal to width W1 minus width W2. It is contemplated that pillar-bar 162 may have a width that is equal to, greater than, or less than the width of pillar-bar 164.

FIG. 1 also shows static region 110 displayed in pillarboxed portion 115 and dynamic region 120 displayed below pillarboxed portion 115. Static region 110 may have width W2 and height H2. Dynamic region 120 has width W3 and height H3. Width W3 may be a width equal to, less than, or greater than width W2, as described above. Similarly, height H3 may be a height equal to or less than height H1, as described above. Specifically, where width W2 and height H2 have an aspect ratio of 4:3 or 16:9, or another ratio as described above with respect to width W1 and height H1, width W3 and height H3 may have an aspect ratio or 22:1. For instance, static region 110 may be video, images, content, or image planes of a DTV, television (TV) program, movie, theater presentation, satellite TV content, digital video disc (DVD), digital video input (DVI), S-video input, component video input (e.g., such as three component video), digital cable content, motion picture experts group (MPEG) content, and/or Advanced Television System Committee (ATSC) content. Dynamic region 120 may represent subtitles, or a portion of a menu screen, photos, special features, or another portion or section that exists at one period of time, but does not exist during another period of time of a television (TV) program, movie, theater presentation, satellite TV content, digital video disc (DVD), digital video input (DVI), S-video input, component video input (e.g., such as three component video), digital cable content, motion picture experts group (MPEG) content, ATSC content, or other digital data for display or digital video source or content. As used herein, "exists" is intended to mean will be displayed on a screen or monitor. For example, a dynamic region of data may be present in a stream of digital video, but will not "exist" on a screen because a menu selection may be preventing or suppressing display of the dynamic region on the screen. Specifically, a DTV menu may be setup prior to displaying a stream of digital video, not to display subtitles. Thus, although the subtitles are present in the stream of digital video and may be decoded, they will note "exist" on the display during display of any portion of the stream unless the menu selection inhibiting their display is altered.

It is contemplated that dynamic region 120 may or may not exist during certain periods of time of a stream of digital video data. For example, a stream of digital data, such as digital video data, including static region 110 (e.g., as coded or uncoded data) may at some point in time include dynamic region 120, and at other points in time exclude dynamic region 120. In one instance, a stream of digital video data includes coded or uncoded data to render or display static region 110 over a period of time, and coded or uncoded data to render or display dynamic region 120 during only a portion of that period of time. Specifically, static region 110 may be video data of a TV program or movie, while dynamic region 120 contains subtitles of the program or movie. As noted above, it is also considered that dynamic region 120 may contain other menus, photos, or special features of a TV program or movie. In such a case, both static region 110 and dynamic region 120 may be filled with the menu, photo, or special feature display, such as where the menu, photo, or special feature display exceeds the size of the TV program or movie displayed in static region 110 and associated with the menu, photos, or special effect feature.

It can be appreciated that in such situations, it is undesirable to have dynamic region 120 extend below area 105, because then it will not be displayed. For example, area 105 may be the total display area of a video display, a monitor, or a television (TV), such as an eye piece display, cell phone display, LCD display, television display or monitor, computer display or monitor, video display or monitor, big screen display, projection display or television, digital television (DTV), combined monitor display, arena display, large crowd event display, or various other monitor or display technologies. Thus, width W1 may be a width between one-half inch and hundreds or thousands of inches. Height H1 may have similar sizes described above with respect to width W1. In addition, W1:H1 may have a ratio or aspect ratio such as 4:3, 16:9, 2.66:1, 2.35:1, 2.20:1, or other display or monitor aspect ratio.

Figure 2:
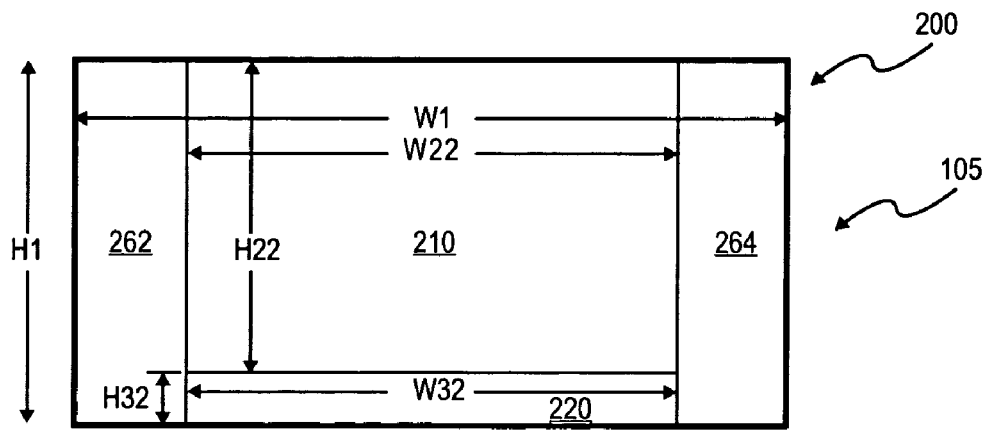
FIG. 2 shows a monitor active display area displaying an active region and a dynamic region.

FIG. 2 shows a monitor active display area displaying an active region and a dynamic region. FIG. 2 shows regions 200 including area 105 having static region 210 with height H22 and width W22. Width W22 may correspond to width W2, as described above. Height H22 may correspond to, be equal to, or be less than height H2, as described above. Moreover, width W22 and height H22 may have a ratio or aspect ratio as described above with respect to width W2 and height H2.

Area 105 also includes dynamic region 220 having width W32 and height H32. Width W32 may be equal to, less than, or greater than width W22. Similarly, height H32 may be less than or equal to height H22. Moreover, width W32 and height H32 may have an aspect ratio related to or equal to the aspect ratio of width W22 and height H22 as described above with respect to width W3, height H3, width W2, and height H2.

According to an embodiment, static region 210 may correspond to static region 110, and dynamic region 220 may correspond to dynamic region 120, and the contents thereof, as described above with respect to FIG. 1, where static region 210 and dynamic region 220 are (linearly) scaled to fit within vertical height H1 of area 105. Thus, as shown in FIG. 2, both static region 210 and dynamic region 220 (e.g., corresponding to content of static region 110 and dynamic region 120) may be displayed in area 105 so that all of the graphics, video, and information contained in those regions is viewable to the viewer or user.

FIG. 2 also shows pillar-bars 262 and 264. Pillar-bars 262 and 264 may correspond to pillar-bars 162 and 164, respectively, as described above. It is to be appreciated that the height of pillar-bars 262 and 264 may be equal to height H1. Similarly, the width of pillar-bar 262 plus pillar-bar 264 may be equal to width W1 less width W22. Moreover, since width W32 may be greater than or less than width W22, pillar-bars 262 and 264 may extend under static region 210 or may have a combined width less than W1 minus width W22, where pillar-bars 262 and 264 are beside or adjacent to dynamic region 220.

Embodiments of the invention address determining when dynamic region 120 exists within a stream of digital data, such as digital video data, so that it is possible to display the dynamic region and static region together within the total or nearly all of the total active display area of a monitor. For example, by detecting the existence of dynamic region 120 of FIG. 1, it is possible to scale static region 110 to be static region 210 and scale dynamic region 120 to be static region 220 so that the content of the static region as well as the dynamic region will be displayed in area 105, such as shown in FIG. 2.

Dynamic region 120 or 220 may be detected in coded or decoded data, such as by a decoding process to determine active areas of a screen (e.g., such as motion vectors, subtitled text or graphics, colors, etc.). Thus, when subtitles, an odd aspect ratio, or other content as described above for dynamic region 120 are used or are to appear, a detector can determine that the subtitles, odd aspect ratio, or dynamic region 120 exists. Subsequently, the detector can communicate the "active area" including the subtitles, odd aspect ratio, or dynamic region 120 into the display pipeline (e.g., such as into the pipeline including frame buffers, scalers, blenders, and other components responsible to format and/or scale data to fit in the active area of a screen), to ensure that the dynamic region as well as the static region is displayed for the user to see.

It is noted that this will also require centering the combined display of the static region and dynamic region so that they fill the vertical range of height H1. For example, scaling static region 110 to the size of static region 210 would require moving the scaled static region vertically up by a height of H32 divided by 2 to put the scaled static region at the position of static region 210 and leave height H32 below static region 210 for display of dynamic region 220.

Figure 3:
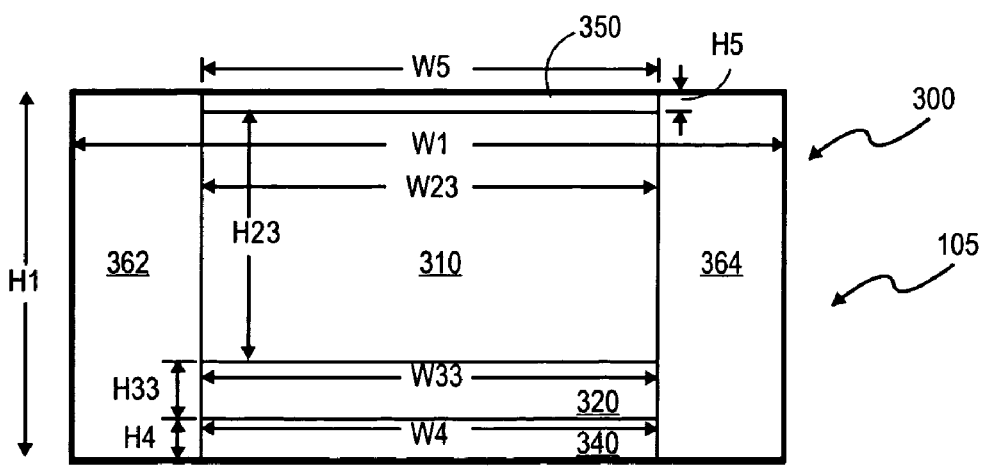
FIG. 3 shows a monitor active display area displaying an active region, a dynamic region, and an unused vertical portion.

FIG. 3 shows a monitor active display area displaying an active region, a dynamic region, and an unused vertical portion. FIG. 3 shows regions 300 including area 105 having static region 310 with height H23 and width W23. Width W23 may correspond to be less than, or be equal to width W2 as described above. Height H23 may correspond to, be equal to, or be less than height H2, as described above. Moreover, width W23 and height H23 may have a ratio or aspect ratio as described above with respect to width W2 and height H2.

Area 105 also includes dynamic region 320 having width W33 and height H33. Width W33 may be equal to, less than, or greater than width W23. Similarly, height H33 may be less than or equal to height H23. Moreover, width W33 and height H33 may have an aspect ratio related to or equal to that described above with respect to FIG. 2 for width W32 and height H32.

According to embodiments, static region 310 may correspond to static region 110 or 210, and dynamic region 320 may correspond to dynamic region 120 or 220, and may have or display the contents thereof, as described above with respect to FIG. 1, where static region 310 and dynamic region 320 are scaled to fit within a vertical height less than height H1 or the vertical height of area 105. Thus, as shown in FIG. 3, both static region 310 and dynamic region 320 may be displayed in area 105 so that all the graphics, video, and information contained in those regions is viewable to the user or viewer, as well as the potential blank, black, or unused monitor vertical height at portion 350 and portion 340.

For instance, portion 350 is shown having width W5 and height H5. Width W5 may correspond to width W2, as described above. Height H5 may correspond to or be less than height H1 as described above. Similarly, FIG. 3 shows portion 340 having width W4 and height H4. Width W4 may correspond to width W2, as described above, and height H4 may correspond to or be less than height H1, as described above. Specifically, it can be appreciated that height H5 plus height H4 may be equal to height H1 less the sum of height H23 and height H33. It is also considered that height H5 may be less than, greater than, or equal to height H4.

In one instance, where the combined height of the dynamic region and/or static region of information being displayed on area 105 is less than the height of area 105, portion 350 and/or portion 340 are black screen, or blanks above and/or below the dynamic portion and/or static portion displayed. Understandably, where dynamic portion 320 does not exist, the black or blank screen at the bottom or area 105 may include what is shown in FIG. 3 as dynamic region 320 (e.g., such as where portion 340 includes dynamic region 320).

FIG. 3 also shows pillar-bars 362 and 364. Pillar-bars 362 and 364 may correspond to pillar-bars 162 and 164, respectively, as described above. It is also to be appreciated that the height of pillar-bars 362 and 364 may be equal to height H1. Similarly, the width of pillar-bar 362 plus pillar-bar 364 may be equal to width W1 less width W23. In other words, pillar-bars 362 and 364, and portions 340 and 350 may define a black screen or blank region around information displayed in static region 310 and dynamic region 320. Moreover, since width W33 may be greater than or less than width W23, pillar-bars 362 and 364 may extend under static region 310 or may have a combined width less than width W1 minus width W23, where pillar-bars 362 and 364 are beside or adjacent to dynamic region 320.

According to embodiments, a system may be used to minimize height H4 and height H5 so that dynamic region 320 and/or static region 310 extends in height to fill all of height H1. In addition, such a system may include a detector to detect whether or not dynamic region 320 exists. When region 320 exists, the system can adjust height H23 plus height H33 to equal height H1. Alternatively, when dynamic region 320 does not exist, the system can adjust height H23 to equal height H1.

Figure 4:
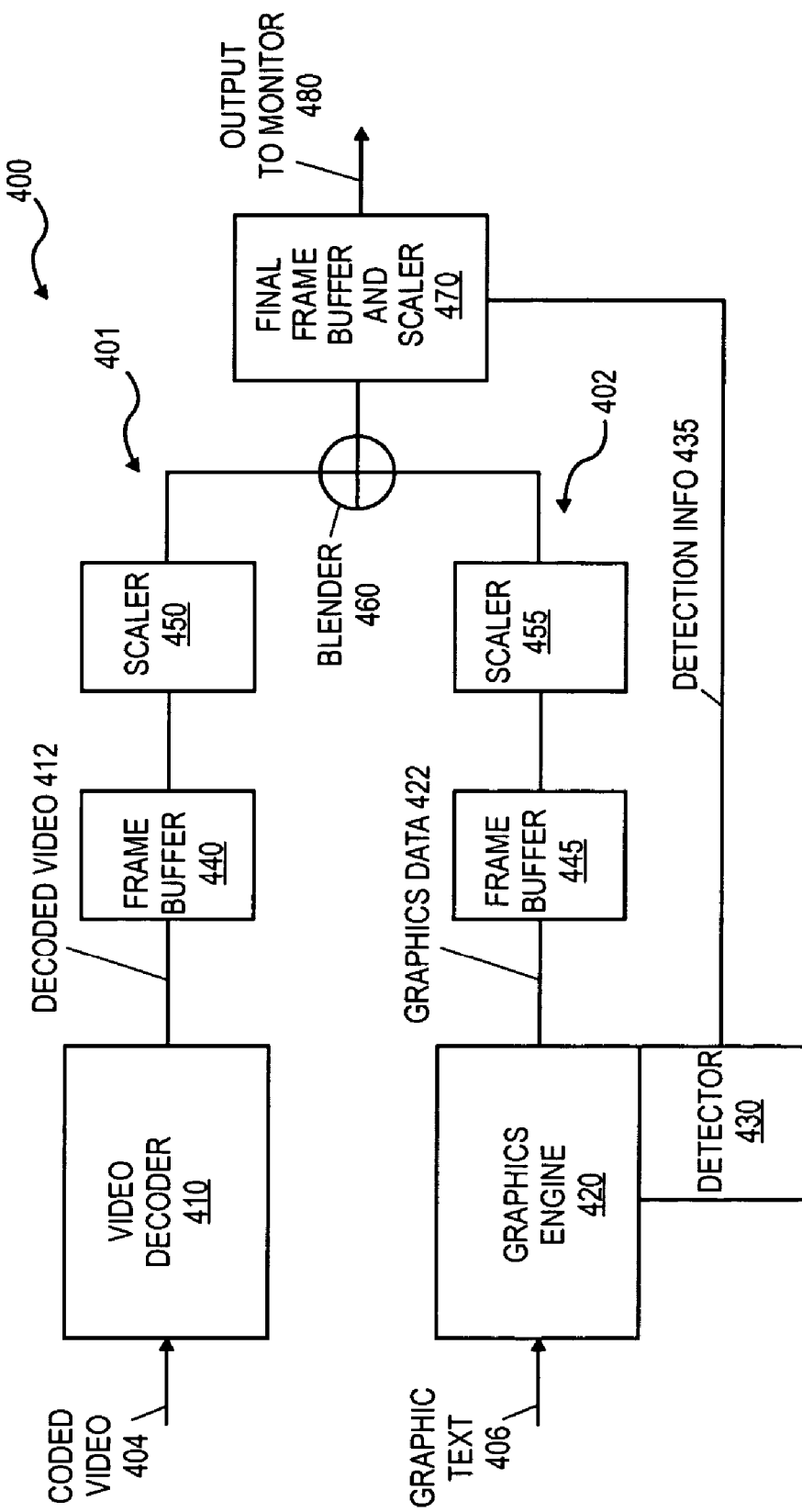
FIG. 4 is a block diagram of a system for auto screen fill based on content of digital video.

For instance, FIG. 4 is a block diagram of a system for auto screen fill based on content of digital video. FIG. 4 shows system 400 including video branch 401 and graphics branch 402 having their output combined at blender 460 for outputting to a monitor. In video branch 401, video decoder 410 receives coded video 404 and outputs decoded video 412, such as image planes, to frame buffer 440. In turn, frame buffer 440 outputs to scaler 450, which provides input to blender 460.

In graphics branch 402, graphics engine 420 receives graphic text 406 and outputs graphics data 422 to frame buffer 445. Frame buffer 445 outputs to scaler 455 which outputs to blender 460. Blender 460 combines the buffered and scaled decoded video data with the buffered and scaled graphics data. Blender 460 outputs to final frame buffer and scaler 470, which provides output to monitor 480, such as for display in area 105.

It may be appreciated that coded video 404 and graphic text 406 may be part of the same digital data stream, video stream, high definition TV stream, digital video stream, and/or MPEG program or transport stream. Graphic text 406 and the display thereof shown on the monitor may include sub-titles, text, symbols, and written language. Also, coded video 404 and the display on the monitor thereof may include image planes, moving pictures, movie images, a television show, and video images. Moreover, coded video 404 and graphic text 406 may be part of an input to be displayed in area 105, where area 105 is a monitor or display as described above with respect to FIG. 1.

Blender 460 combines the pre-scaled, buffered decoded video data with the pre-scaled, buffered graphics data. Blender 460 outputs to final frame buffer and scaler 470 which provides output to monitor 480, such as for display in area 105.

According to embodiments, detector 430 is coupled to graphics engine 420 to determine whether a dynamic region exists. For example, detector 430 may detect whether or not graphic text 406 actually includes text or data to be displayed on the monitor. It is considered that detector 430 may be part of, coupled to, or separate from graphics engine 420. For instance, according to embodiments, detector 430 may monitor graphic data 422 without being coupled to or part of graphics engine 420.

Detector 430 outputs detector information 435 to final frame buffer and scaler 470. Thus, final frame buffer and scaler 470 may adjust the vertical display size & offset of a static region of video from the video branch sufficiently to also display a dynamic region of graphics data within the vertical active display area of a monitor, during the time that the dynamic region exists. Specifically, detector 430 detects whether or not the dynamic region exists, and sends detector info 435 to final frame buffer and scaler 470, so that final frame buffer and scaler 470 can adjust the vertical size of the video from the video branch and the graphics from the graphics branch to fit within the vertical height of the display monitor, such as for display in area 105.

Similarly, final frame buffer and scaler 470 may adjust the vertical display size of the static video data from the video branch sufficiently to display the video data within the vertical height of the monitor when the dynamic graphics data from the graphics branch does not exist. Specifically, detector 430 detects that graphics data or text does not exist and sends that information to final frame buffer and scaler 470 via detector info 435, so that final frame buffer and scaler 470 can adjust the height of the static video data to fit within the display height of the monitor, such as for display in area 105.

Moreover, final frame buffer and scaler 470 may adjust the total height of the static video and dynamic graphics, when the dynamic graphics is detected, to fill the vertical height of the monitor completely, such as by minimizing the vertical portion of the monitor not displaying the video or graphics data. Likewise, when dynamic graphics data is not detected, final frame buffer and scaler 470 may adjust the height of static video data from the video branch to fill the entire vertical height of the monitor to minimize any vertical portion of the monitor not displaying the static video data.

Referring to FIG. 3, when detector 430 detects dynamic graphics data, final frame buffer and scaler 470 may adjust the vertical display size of the static video data and dynamic graphics data so that height H23 plus height H33 equals height H1, thus minimizing or removing portions 340 and 350. Also, when detector 430 does not detect dynamic graphics data, final frame buffer and scaler 470 may adjust the height of the static video data such that height H23 is equal to height H1, thus minimizing or removing regions 340 and 350, as well as dynamic region 320 (e.g., in this case, there is no data to fill dynamic region 320, therefore display of dynamic region 320 is not necessary).

Thus, detector 430 may look for and find, look for and not find, confirm the existence of, confirm absence of, identify, or otherwise know that graphics text 406 does or does not include content to be displayed on the monitor. It is also considered that detector 430 may similarly detect a dynamic region, other than graphics text, such as menus, photos, and special features of coded or decoded digital video and/or graphics input.

Furthermore, system 400 may output for display (e.g., such as for display in area 105) the dynamic and static regions in vertical alignment, such as stacked, having the same vertical edges, or having the same vertical axis but not having the same width. Moreover, the dynamic region and static region be displayed not in vertical alignment, such as not by having the same vertical axis. Likewise, final frame buffer and scaler 470 may adjust the vertical and horizontal size of the static video data and dynamic graphics data proportionally for each region, or for both regions. In other words, referring to FIG. 2, final frame buffer and scaler 470 may adjust height H22 in proportion with width W22 to keep the same aspect ratio after adjustment as prior to adjustment. Also, final frame buffer and scaler 470 may adjust with width W32 and height H32 proportionally, such as to keep the same aspect ratio after adjustment as prior to adjustment. Furthermore, final frame buffer and scaler 470 may adjust the height, width, and/or the aspect ratio of static region 210 equally or in proportion with an adjustment to the height, width, and/or aspect ratio of dynamic portion 220.

For example, referring to FIG. 3, final frame buffer and scaler 470 may detect unused vertical portion 340 and/or 350 where neither dynamic region 320 nor static region 310 are being displayed, and remove, or minimize portions 340 and 350, by increasing the height or aspect ratio of static portion 310 and dynamic portion 320 so that height H23 plus height H33 equals height H1. Likewise, when static 320 does not exist, final frame buffer and scaler 470 may adjust the aspect ratio or height of static region 310 such that height H23 equals height H1. In other words, if a static region 310, with or without dynamic region 320 is displaying "letterboxed" active material or content, frame buffer and scaler 470 will detect black regions in the video above and below the "letterboxed" active material or content and remove them by adjusting the vertical scaling.

It is also considered that the vertical size of the graphics data to be displayed from graphics text 406 (e.g., the data input to blender 460 from the graphics branch) may vary in size over time. Thus, final frame buffer and scaler 470 may compensate for such a change in vertical height of the graphics data over time and adjust the vertical height of the static region and dynamic region during those changes to minimize any vertical portion of the active screen not displaying the static and vertical regions. For instance, referring to FIG. 2, if height H32 of dynamic region 220 changes over time, final frame buffer and scaler 470 may adjust height H22 and height H32 during those changes so that height H22 plus height H32 equal height H1 regardless of the changes to height H32.

For example, system 400 may represent an embodiment of a digital TV, a personal computer with a DVD player or that receives MPEG (e.g., such as via the Internet), a system having an set top box (STB) function, a cable TV system, or an Advanced Television System Committee (ATSC) system. It is contemplated that system 400 may include a manual vertical and horizontal adjustment, such as one that can be adjusted by a user (e.g., such as by a menu screen on the monitor or manual adjustment buttons or knobs).

Figure 5:
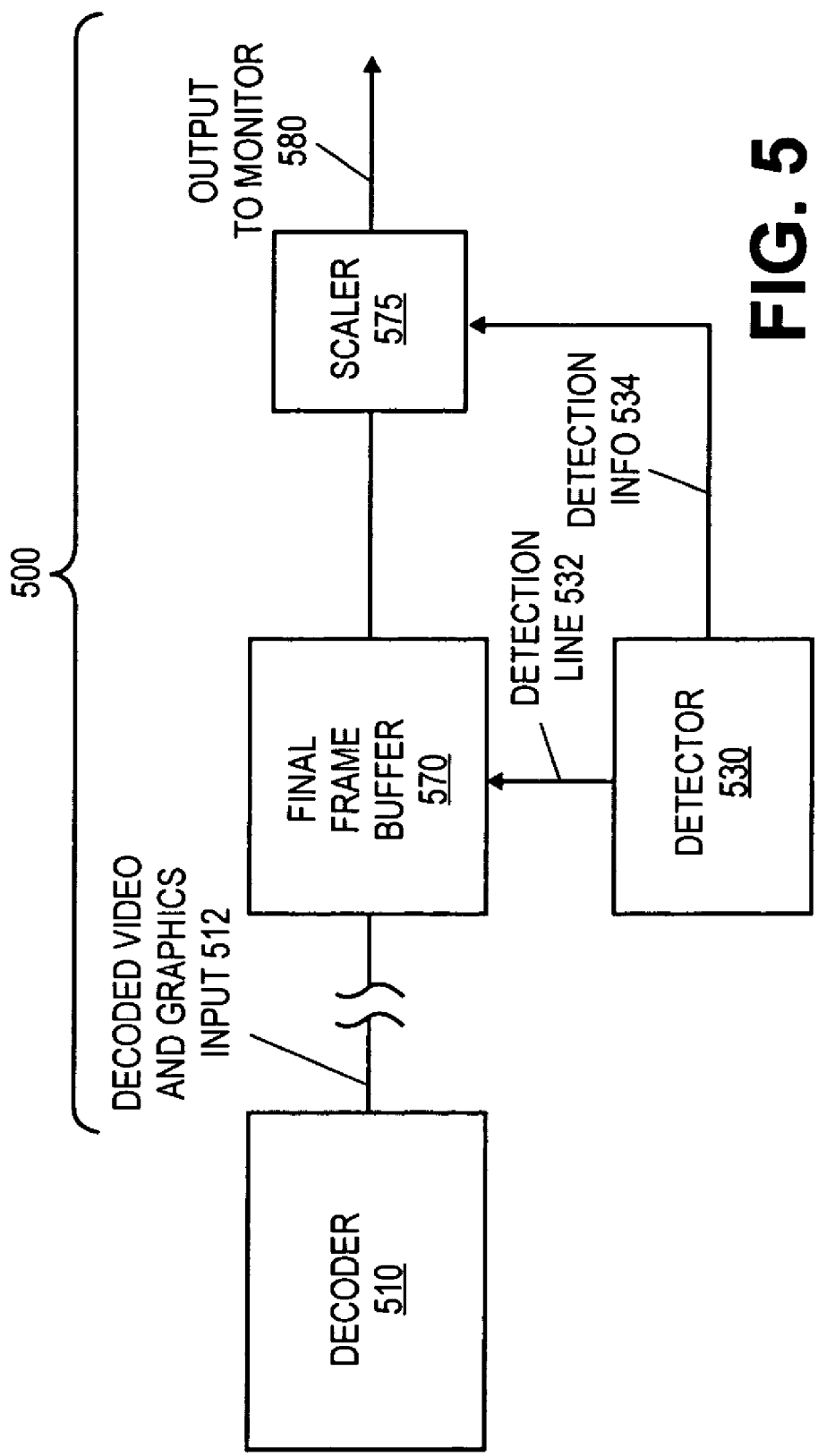
FIG. 5 is a block diagram of a system for auto screen fill based on content of digital video.

According to embodiments, it is also considered that a detector may be used to detect the existence of the dynamic region without a decoder, such as after the digital data or digital video data has been decoded. For example, FIG. 5 is a block diagram of a system for auto screen fill based on content of digital video. FIG. 5 shows system 500 including final frame buffer 570 coupled to scaler 575 and detector 530. Detector 530 is coupled to final frame buffer 570 via detection line 532 and provides detector information 534 to scaler 575.

Thus, system 500 may receive input from a decoder and output from scaler 575 output to monitor 580. Specifically, as shown in FIG. 5, final frame buffer 570 receives decoded video and graphics input 512 from decoder 510 which is external to system 500. For example, system 500 may be a system that receives video from a DVD player, an HDMI, a DVI, or component video.

According to embodiments, detector 530 detects whether a dynamic region exists by monitoring final frame buffer 570 via detection line 532 and sends information related to that detection to scaler 575 via detector info 534. For instance, detector 530 may monitor decoded graphics input 512 to determine whether a dynamic region exists by monitoring the height or vertical component of decoded graphics info 512, data within final frame buffer 570, or data output by final frame buffer 570 to scaler 575 for changes. For instance, when the vertical size of the decoded input, data within frame buffer 570, or data output by frame buffer 570 is larger than the vertical size expected for the static region (e.g., such as for display in area 105), detector 530 detects that the dynamic region exists. It is also considered that detector 530 can monitor for the dynamic region without knowing an expected vertical height for the static region simply by detecting the occurrence of increases and decreases in the total height, and or detecting "letterbox" regions of black above and below the active material or content, regardless of whether the vertical height changes of the data passing through final frame buffer 570 and indicating to scaler 575 when there is an increase or decrease in the total vertical height of the data passing through the frame buffer. Moreover, detector 530 can monitor by detecting "letterbox" regions of black above and below the active material or content without knowing an expected vertical height for the static and/or dynamic region (e.g., such as regardless of whether the vertical height of the data passing through final frame buffer 570 changes, and indicating to scaler 575 when the total vertical height of the data passing through final frame buffer 570 is too large or too small in height to fill the total vertical size of display area 105.

When detector 530 detects dynamic region, it sends detector information 534 to scaler 575 to scale output to monitor 580, and vertical offset information to Final Frame Buffer 570, similar to that described above with respect to final frame buffer and scaler 470 scaling output to monitor 480, for FIG. 4. Thus, detector 530 may monitor decoded static video data and decoded dynamic graphics data, or other decoded data, such as described above with respect to detector 430, but in decoded form. Likewise, scaler 575 may scale dynamic regions and/or static regions, as described above with respect to final frame buffer and scaler 470, for providing an output to a monitor, to fill the complete vertical active area of the monitor (e.g., such as for display in area 105), as described above with respect to the output of final frame buffer and scaler 470.

Hence, according to embodiments, the display pipelines shown in FIGS. 4 and 5 may offset the active area and/or video content (e.g., such as a static region and/or dynamic region) vertically upwards to fill the vertical height of the screen (e.g., such as height H1) once the subtitles, odd aspect ratio, or dynamic region is detected, so that the active area "best fits" or fills the active display area of the monitor.

It is contemplated that detector 430, buffer and scaler 470, detector 530, and/or scaler 575 may be embodied in software instruction or in a machine accessible medium containing such instructions. Also, detector 430, buffer and scaler 470, detector 530, and/or scaler 575 may be part of a DTV or computer system having a processor and a memory to store instructions, such as those described above, to be executed by the processor.

Figure 6:
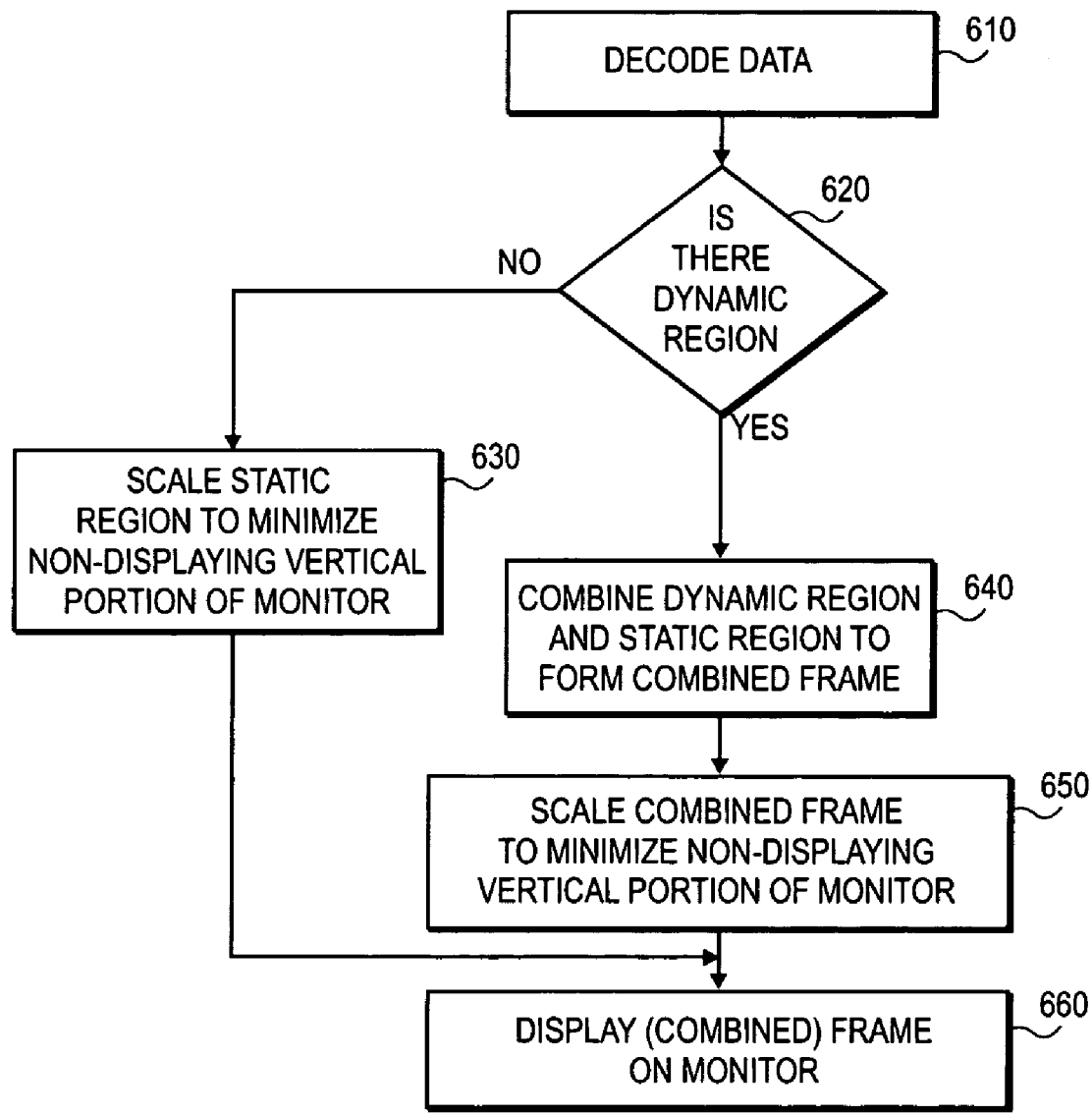
FIG. 6 is a flow diagram of a process for auto screen fill based on content of digital video.

FIG. 6 is a flow diagram of a process for auto screen fill based on content of digital video. At block 610, digital video data is decoded. For example, block 610 may include decoding a coded version of a stream of digital video data to be displayed in area 105, having static region 110, and/or having dynamic region 120, such as having data as described above with respect to FIG. 1. Moreover, block 610 may correspond to decoding as described above with respect to video decoder 410, graphics engine 420, and/or decoder 510.

At decision block 620, it is determined whether a dynamic region exists in the digital data. For example, block 620 may include detecting a dynamic region, detecting graphics data, detecting sub-titles, detecting an odd aspect ratio, detecting a menu, detecting photos, and/or detecting special features, as described herein. Specifically, block 620 may correspond to monitoring a coded or decoded channel or graphics stream of data to confirm existence of graphics data to be displayed on a monitor. It is contemplated that block 620 may correspond to descriptions above with respect to graphics engine 420, decoder 430, frame buffer 570, detection line 532, and detector 530.

If at decision block 620 a dynamic region does not exist, the process proceeds to block 630, where the static region is scaled to minimize the non-displaying vertical portion of the monitor. For example, block 630 may include adjusting the vertical display size of the static region sufficiently to include the static region on the monitor while minimizing vertical portions of the monitor not displaying the static region. Also, block 630 may include detecting unused vertical portions of the monitor to affect their removal or reduction in vertical size. Block 630 may correspond to descriptions above with respect to static regions 110, 210, 310; final frame buffer and scaler 470; and scaler 575.

If at block 620 a dynamic region does not exist, the process continues to block 640. At block 640, the dynamic region is combined with the static region to form a combined region or frame of data. For example, block 640 may include combining the dynamic region and static region to be or not to be vertically aligned, to have or not to have the same width, by scaling or not by scaling those regions proportionally.

Block 640 may correspond to the descriptions above with respect to static region 210 and dynamic region 220, static region 310 and dynamic region 320, blender 460, final frame buffer and scaler 470, decoded video and graphics input 512, final frame buffer 570, and scaler 575.

According to embodiments, block 640 may occur at different locations in the flow of FIG. 6. For instance, block 640 may occur prior to block 610 and prior to decision block 620. Specifically, block 640 may occur prior to block 620, such as to correspond with the block diagram shown in FIG. 5, having system 500.

At block 650, the combined frame or regions are scaled to minimize the non-displaying vertical portion of the monitor. For example, at block 650, the vertical display size of the static region and the dynamic region may be adjusted sufficiently to display the vertical height of the static region and dynamic region in the monitor while minimizing vertical portions of the monitor not displaying the static or dynamic regions. Thus, block 650 may include detecting unused vertical portions of the monitor and increasing the size of the static region and/or dynamic region to remove or minimize the unused vertical portions of the monitor. Block 650 may correspond to description above with respect to block 630, regions 110 and 120, regions 210 and 220, regions 310 and 320, and final frame buffer and scaler 470.

After block 630 or block 650, the process continues to block 660. At block 660, the static region or the combined frame or regions are displayed on a monitor. For example, block 660 may correspond to displaying the static region to minimize the non-displaying vertical portion of the monitor as scaled at block 630. Likewise, block 660 may correspond to displaying the dynamic region and the static region to minimize the non-displaying vertical portion of the monitor, as scaled at block 650. Block 650 may correspond to descriptions above with respect to final frame buffer and scaler 470, output to monitor 480, scaler 575, and output to monitor 580.

Also, according to embodiments, offsetting or moving the static region and the dynamic region, adjusting the vertical display size of the static region and dynamic region, adjusting the aspect ratio of the static region and the dynamic region, minimizing the unused vertical portion of the monitor, descriptions mentioned with respect to block 630 or block 650, or descriptions related to final frame buffer and scaler 470 or scaler 575 may include changing those locations, sizes, offsets, and minimizations in a phased, gradual, or iterative process with respect to time. For example, the regions may be moved; scaled; increased or decreased in height and/or width; increased or decreased in aspect ratio; or scaled in a linear or non-linear increasing or decreasing progression over time. Suitable progressions include moving; scaling; increasing or decreasing in height and/or width; and changing a height or aspect ratio in a range starting from a zero change and progressing to the appropriate change to fill the vertical active display screen or minimize the unused screen space over a period of time.

In other words, the adjustments described herein with respect to regions 110, 120, 210, 220, 310, 320, 340, and 350; descriptions related to final frame buffer and scaler 470 and scaler 575; and processes described with respect to block 630 and 650 may dynamically adjust the frame, region, or data to be displayed by looking ahead in the stream or considering the data prior to output to the display, and changing the data being output to the monitor in a progression of iterations until the desired output is sent to the monitor.

In such a process, the viewer may see the vertical height of the static region and/or dynamic region to gradually increase or decrease over time when detection of the dynamic region terminates or is initiated, so that there is no a sudden jump or jerk in the image viewed. For example, upon detection of dynamic region 220, buffer and scaler 470 or scaler 575 may gradually decrease the height of region 210 and gradually increase the height of region 220 by the same height, instead of suddenly changing the height of the static region from H1 to H22 and suddenly displaying region 220 in the next display frame after display region 220 did not exist in the prior frame. Instead, the height of the static region may be changed during a number of iterations with respect to time in a range of between two and a hundred iterations where each iteration increases or decreases the height of the static region by H32 divided by the number of iterations. Similarly, upon non-detection of dynamic region 220, buffer and scaler 470 or scaler 575 may gradually increase the height of dynamic region 220 by H32 over a number of iterations in the range described above, while decreasing the height of static region 210 by a corresponding amount of height, instead of suddenly deleting display of region 220.

Of course, where dynamic region 220 displays sub-titles, iteratively adding dynamic region 220 would be quick enough to display the text of the sub-titles with sufficient time for the viewer to read them. Similarly, iterative removal or deletion of dynamic region 220 would occur slow enough that to allow a viewer to complete reading subtitles before dynamic region 220 was deleted. Thus, addition or removal of dynamic region 220 from area 105 may be a more appealing and less shocking experience for the viewer.

It can be appreciated that the concepts, processes, and devices described above may be applied to "best fit" or fill the total horizontal size of a display monitor or screen with active material or content. For example, regions 100, 200, and 300 may be rotated ninety degrees around an axis perpendicular to the view shown in FIG. 1-3, and the same concepts applied as described above with respect to FIGS. 1-6. Specifically, in such a case, portion 115 may be a letterbox portion, and pillar-bars 162 and 164 may be below and above letterbox portion 115.

In the foregoing specification, specific embodiments are described. However, various modifications and changes may be made thereto without departing from the broader spirit and scope of embodiments as set forth in the claims. The specification and drawings are, accordingly, to be regarded in an illustrative rather than a restrictive sense.

What is claimed is:

1. A method comprising:
   detecting in a coded stream of digital video data to be displayed over a period of time, whether to display a dynamic region by detecting decoded digital data only representing text, the dynamic region including the decoded digital data only representing text data of text of the stream to be displayed in a first portion of a monitor, the dynamic region to be displayed during a selected sub-period of the period of time but not during another different selected sub-period of the period of time, the stream including a different second coded signal including a static region to be displayed in a different second portion of the monitor, wherein detecting decoded digital data only representing text includes monitoring a decoded graphics stream channel only having the coded digits representing characters of only digital text data, and finding a stream of characters of only digital text data included in the channel having decoded text data content; and further comprising:
   based on finding characters of only digital text data, decreasing a vertical size of the static region; then
   monitoring the decoded graphics stream channel only having the coded digits representing characters of only digital text data,
   not finding characters of only digital text data included in the channel having decoded text data content; and
   based on not finding characters of only digital text data, increasing a vertical size of the static region;
   combining the dynamic region and the static region into an output to a display device when characters of only digital text data are found; and
   not combining the dynamic region and the static region into the output to the display device when characters of only digital text data are not found.

2. The method of claim 1, wherein the first portion of the monitor is in vertical alignment with the second portion of the monitor.

3. The method of claim 1, wherein detecting includes detecting a coded version of only text data in the first signal, and decoding the coded version into only coded digits representing characters of text, separately from decoding the second signal of the stream of digital video data.

4. The method of claim 3, wherein detecting is only based on detecting decoded graphics text from a decoded version of the first signal of the stream of digital video data.

5. The method of claim 1, wherein the dynamic region is an active display area of text graphics, the static region is an active display area of video, and the text graphics is to be displayed on the monitor and under the video.

6. The method of claim 1, wherein detecting includes monitoring a vertical size of the dynamic region and a vertical size of the static region.

7. The method of claim 1, wherein combining comprises:
   combining a pre-scaled buffer output from a video decoder with a pre-scaled buffer output from a graphics engine into a single output of combined data to a scaler that scales the combined data into the output to the display.

8. The method of claim 1 further comprising:
   receiving a third coded signal comprising the first coded signal and the second coded signal.

9. The method of claim 8, wherein detecting comprises monitoring the third coded signal and detecting that the dynamic region does not exist if the first coded signal does not exist, and detecting that the dynamic region does exist if the first coded signal does exist and is detected in the third coded signal.

10. The method of claim 1, wherein the detected decoded digital data represents only text data of text.

11. The method of claim 1, where detecting is performed by a detector that sends detect information to a final frame buffer and a scaler, the detect information indicating whether the decoded digital data only representing text was detected; and wherein the final frame buffer and scaler perform the combining.

12. A method comprising:
   adjusting a display size of a static region of a stream of digital video data to be vertically displayed on a monitor, if a dynamic region is detected by detecting decoded digital data only representing text, the dynamic region including the decoded digital data only representing text data of text to be vertically displayed on the monitor when the decoded digital data only representing text is detected, wherein adjusting includes monitoring a decoded graphics stream channel only having the coded digits representing characters of only digital text data, and finding a stream of characters of only digital text data included in the channel having decoded text data content; and further comprising:
   based on finding characters of only digital text data, decreasing a vertical size of the static region; then
   monitoring the decoded graphics stream channel only having the coded digits representing characters of only digital text data,
   not finding characters of only digital text data in the channel having decoded text data content; and
   based on not finding characters of only digital text data, increasing a vertical size of the static region;
   combining the dynamic region and the static region into an output to the monitor when the characters of only digital text data are found;
   not combining the dynamic region and the static region into the output to the monitor when the characters of only digital text data are not found;
   displaying the dynamic region and the static region on the monitor, if the characters of only digital text data are found;

not displaying the dynamic region, but displaying the static region on the monitor, if the characters of only digital text data are not found;
wherein adjusting includes minimizing a portion of the monitor not displaying the dynamic region or the static region,
wherein the static region is decoded from a different second coded signal which is decoded separately from the first coded signal.

13. The method of claim 12, further comprising:
detecting an unused vertical portion of the monitor where the dynamic region and static region are not displayed.

14. The method of claim 12, wherein the dynamic region comprises:
a first horizontal and vertical region and the static region comprises a second horizontal and vertical region, and adjusting includes proportionally scaling the first vertical and horizontal regions, and proportionally scaling the second vertical and horizontal regions.

15. The method of claim 12, wherein the dynamic region includes decoded graphics data of text to be displayed from a coded version of the stream of digital video data, and the static region includes decoded video data to be displayed from the coded version.

16. The method of claim 12, wherein displaying includes displaying the dynamic region and the static region in a vertical alignment on the monitor.

17. The method of claim 12, wherein the static region has a first vertical display size within an active vertical display size of the monitor when the first region is not detected, the static region has a second vertical display size within the active vertical display size when the dynamic region is detected, and the dynamic region has a third vertical display size within the active vertical display size of the monitor, and the second vertical display size plus the third vertical display size equal the first vertical display size.

18. The method of claim 12, wherein adjusting includes offsetting the static region vertically upwards by a distance equal to a vertical size of the dynamic region.

19. The method of claim 18, wherein offsetting includes offsetting by a linearly increasing progression of vertical distance starting at zero and progressing to the vertical size of the dynamic region over a period of time.

20. A system comprising:
a processor;
a memory to store an application to be executed by the processor; and
a device including:
a detector to detect whether to display a dynamic region by detecting decoded digital data only representing text, the dynamic region including the decoded digital data only representing text data of text of a stream of digital video data to be displayed in a first portion of a monitor only when the decoded digital data only representing text is detected, the stream including a different second coded signal including a static region to be displayed in a second portion of the monitor regardless of whether or not the decoded digital data only representing text is detected, wherein detecting a dynamic region includes monitoring a decoded graphics stream channel only having the coded digits representing characters of only digital text data, and finding a stream of characters of only digital text data included in the channel having decoded text data content; and further comprising:
based on finding characters of only digital text data, decreasing a vertical size of the static region; then monitoring the decoded graphics stream channel only having the coded digits representing characters of only digital text data,
not finding characters of only digital text data included in the channel having decoded text data content; and
based on not finding characters of only digital text data, increasing a vertical size of the static region;
a frame buffer to:
(a) adjust a vertical display size of the second portion sufficiently to include display of the dynamic and static regions on the monitor in vertical alignment, and minimize a vertical portion of the monitor not displaying the dynamic or static regions, while the characters of only digital text data are found, and
(b) adjust a vertical display size of the second portion sufficiently to include display of the static region on the monitor, and minimize a vertical portion of the monitor not displaying the static region, while the dynamic region is not detected;
a blender to combine the characters of only digital text data and the static region into an output to the frame buffer.

21. The system of claim 20, wherein the frame buffer orients the first and second portion for display on the monitor in a vertical alignment.

22. The system of claim 20, wherein the frame buffer is to detect an unused vertical portion of the monitor where the first and second portions are not displayed, while the dynamic region is detected, and to detect an unused vertical portion of the monitor where the second portion is not displayed, while the dynamic region is not detected.

23. The system of claim 20, wherein the detector includes one of a graphics engine to receive coded text data of a coded version of the stream of digital video data, and a frame buffer to monitor a vertical height to be displayed on the monitor of the first portion plus a vertical height to be displayed on the monitor of the second portion.

24. The system of claim 20, wherein the dynamic region includes decoded graphics data of text to be displayed from a coded version of the stream of digital video data, and the static region includes decoded video data to be displayed from the coded version.

25. The system of claim 20, further comprises:
a graphics branch having a graphics engine and a first frame buffer to output a pre-scaled graphics buffer output from the graphics engine;
a video branch having a video decoder and a second frame buffer to output a pre-scaled buffer video output from the video decoder;
the blender to combine the pre-scaled graphics buffer output with the pre-scaled buffer video output.

26. The system of claim 20, wherein the detected decoded digital data represents only text data of text.

27. The system of claim 20, wherein the detector further send detector information to a final frame buffer and a scaler; wherein the final frame buffer and scaler perform the adjusting and blending.

28. A non-transitory machine accessible medium containing instructions that, when executed, cause a machine to:
detect in a coded stream of digital data to be displayed over a period of time, whether to display a dynamic region by detecting decoded digital data only representing text, the dynamic region including the text decoded digital data only representing text data of text in a region of graphics information below a region of video during a selected sub-period of the period of time but not during another different selected sub-period of the period of time, wherein the stream of digital data includes a different second coded signal including video data to display the region of video and the data to display a region of graphics information, and detecting includes determining a size of an unused vertical portion of an active portion of a display screen, wherein detecting a decoded digital data only representing text includes monitoring a decoded graphics stream channel only having the coded digits representing characters of only digital text data, and finding a stream of characters of only digital text data included in the channel having decoded text data content; and further comprising:
based on finding characters of only digital text data, decreasing a vertical size of the static region; then
monitoring the decoded graphics stream channel only having the coded digits representing characters of only digital text data,
not finding characters of only digital text data included in the channel having decoded text data content; and
based on not finding characters of only digital text data, increasing a vertical size of the static region;
combining the dynamic region and the static region into an output to a display device when the characters of only digital text data are found; and
not combining the dynamic region and the static region into the output to the display device when the characters of only digital text data are not found.

29. The machine accessible medium of claim 28, wherein the data to display a region of graphics information includes one of subtitles, text, symbols, and written language; and the video data includes one of a plurality of image planes, a plurality of moving pictures, a movie, a television show, and video images.

30. The machine accessible medium of claim 28, wherein the data to display a region of graphics information includes a vertical component that changes with time, and the video data includes a vertical component that is constant over time.

31. The machine accessible medium of claim 28, wherein the stream of digital data is coded data, the data to display a region of graphics information may or may not exist as a first coded part of the stream and has a vertical component that changes with time, and the stream of digital data continually exists as a second coded part of the stream and includes a vertical component that is constant over time.

32. The machine accessible medium of claim 28, wherein detecting includes one of: (a) decoding coded graphics information of the stream, and (b) determining that a vertical size of a decoded framed image to be output is larger than when the graphics part does not exist.

33. The machine accessible medium of claim 28, wherein the detected decoded digital data represents only text data of text.

* * * * *